United States Patent [19]

Thompson, deceased

[11] Patent Number: 4,880,083

[45] Date of Patent: Nov. 14, 1989

[54] DECELERATION APPARATUS AND METHOD FOR STOPPING A RACING VEHICLE

[75] Inventor: Marion L. Thompson, deceased, late of San Juan Capistrano, Calif., by Collene Campbell, executor

[73] Assignee: Mickey Thompson Entertainment Group, Anaheim, Calif.

[21] Appl. No.: 216,108

[22] Filed: Jul. 7, 1988

[51] Int. Cl.⁴ ............................................. B60T 1/12
[52] U.S. Cl. .................................... 188/2 R; 188/32; 446/429
[58] Field of Search ............... 180/281, 289; 188/2 R, 188/32, 65.1, 372, 374; 446/429, 430, 457, 462

[56] References Cited

U.S. PATENT DOCUMENTS

| | | |
|---|---|---|
| 2,501,997 | 3/1950 | Doolittle ......................... 188/65.1 X |
| 2,692,741 | 10/1954 | Glass ............................... 244/110 R |
| 2,814,453 | 11/1957 | Trimble, Jr. et al. . |
| 2,980,213 | 4/1961 | van Zelm et al. .................. 188/372 |
| 3,092,210 | 6/1963 | Ronnerström ................. 188/65.1 X |
| 3,114,522 | 12/1963 | Mortimer . |
| 3,140,845 | 7/1964 | Cotton . |
| 3,165,298 | 1/1965 | Doolittle et al. . |
| 3,168,939 | 2/1965 | Haber . |
| 3,172,504 | 3/1965 | Daniels et al. ..................... 188/32 X |
| 3,211,260 | 10/1965 | Jackson ............................. 188/372 |
| 3,456,908 | 7/1969 | Mayhew, Jr. et al. . |
| 3,578,271 | 5/1971 | Thompson, Jr. . |
| 3,695,559 | 10/1972 | Cruger et al. . |
| 3,876,170 | 4/1975 | Whittingham . |
| 4,231,535 | 11/1980 | Schlegel et al. . |

Primary Examiner—Duane A. Reger
Attorney, Agent, or Firm—Fulwider, Patton, Lee & Utecht

[57] ABSTRACT

A deceleration method and apparatus for stopping a racing vehicle a predetermined distance beyond a race course finish line after a speed run from a standing start. A tether system having an elongated free payout portion is attached to the vehicle at the start line. The tether payout portion is arranged behind the vehicle for easy payout. It is relatively light so as not to impede travel of the vehicle over the race course. The length of the payout portion approximates the length of the course so that all slack is taken out of it by the time the vehicle reaches the finish line. Energy absorbing apparatus is attached to the tether system to place the payout portion in tension when it is payed out. In one embodiment the energy absorbing apparatus includes a manually operated friction braking system. In another embodiment it includes a hydraulic braking system employing rotor vanes rotating past stators in a compartment containing a liquid such as water. The method and apparatus are adapted to accommodate racing vehicles of various weights.

24 Claims, 4 Drawing Sheets

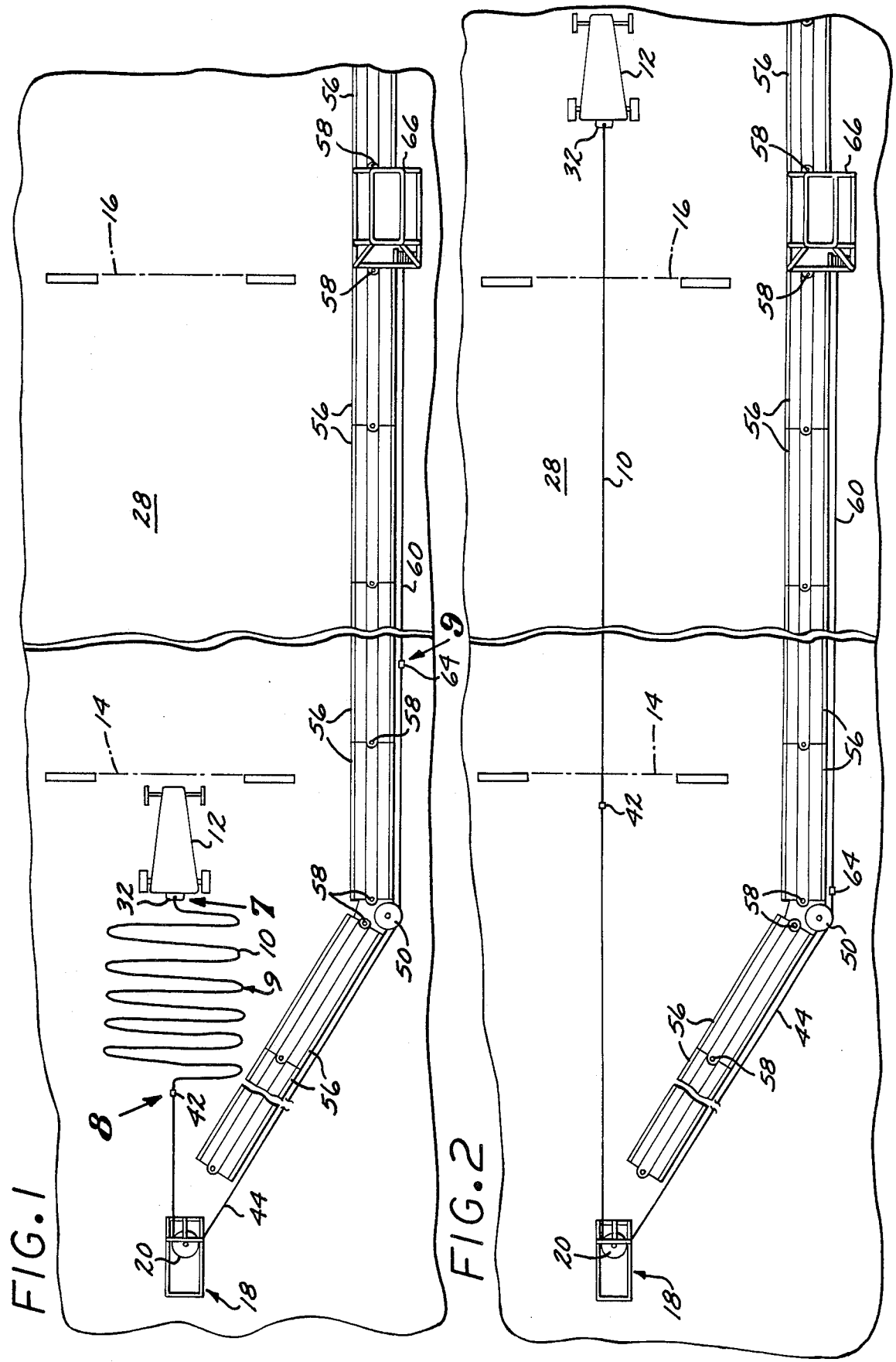

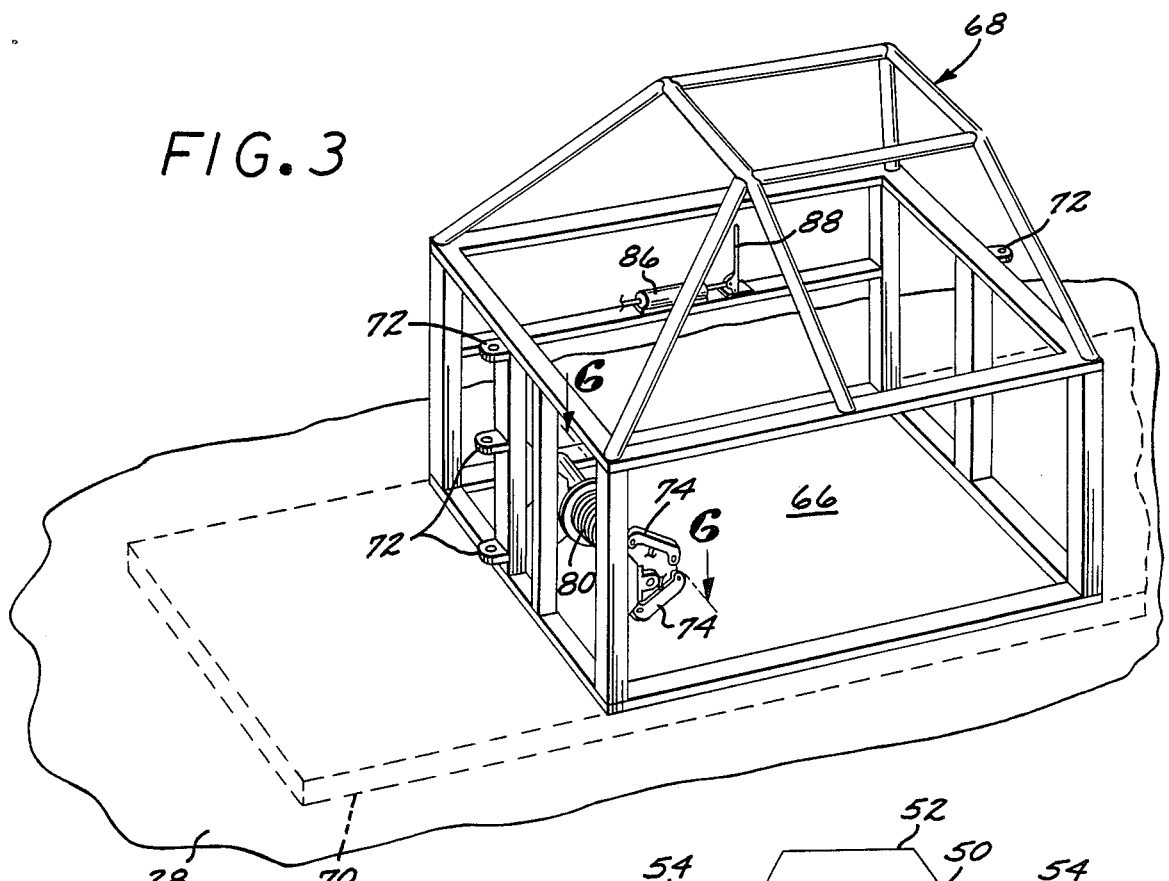
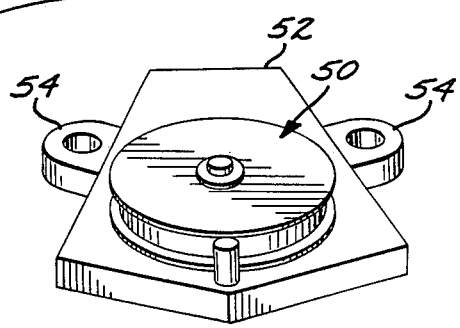
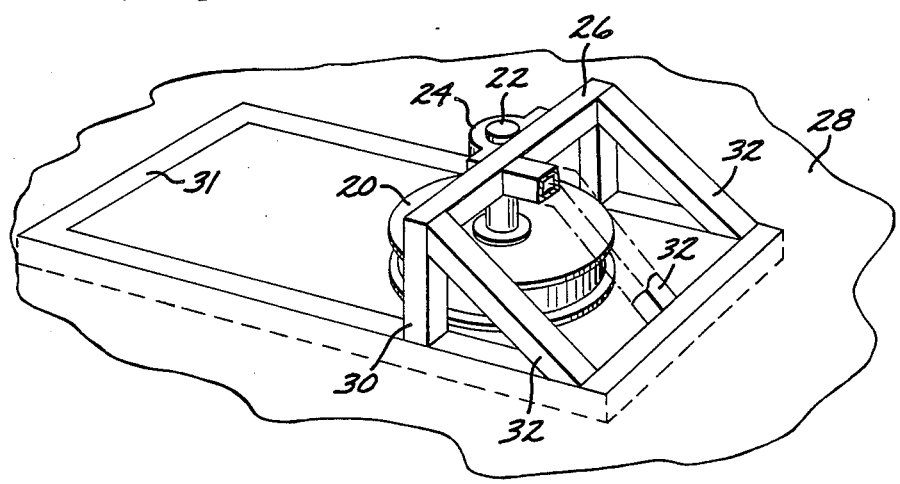

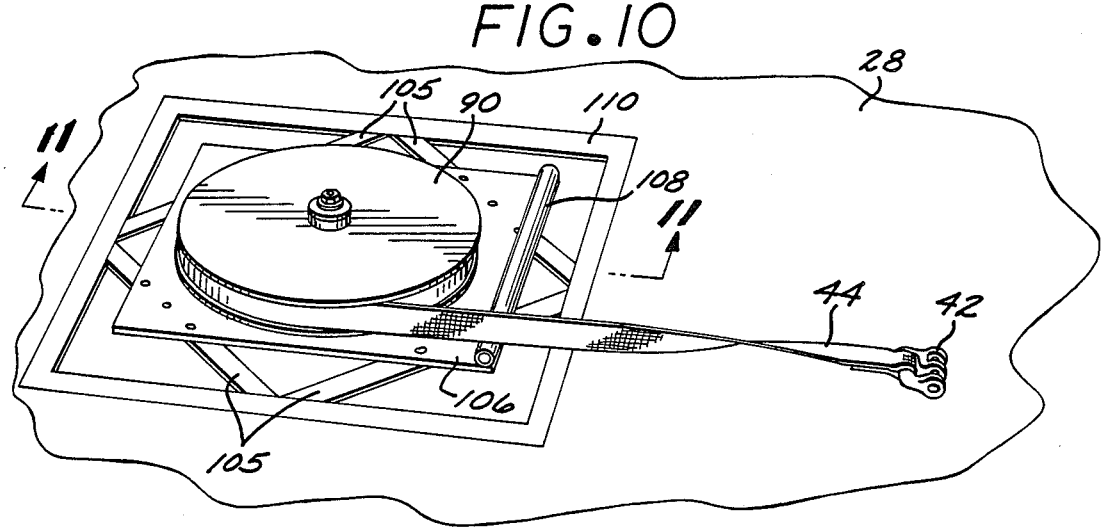
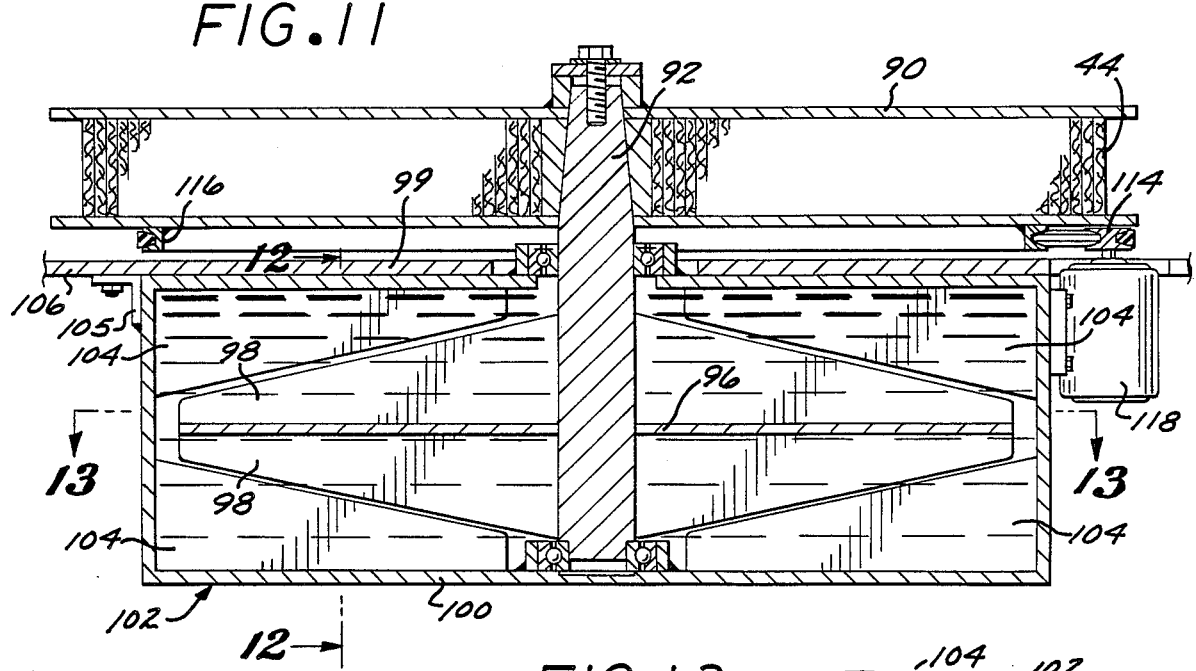
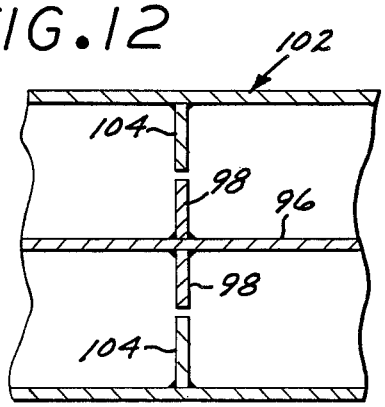
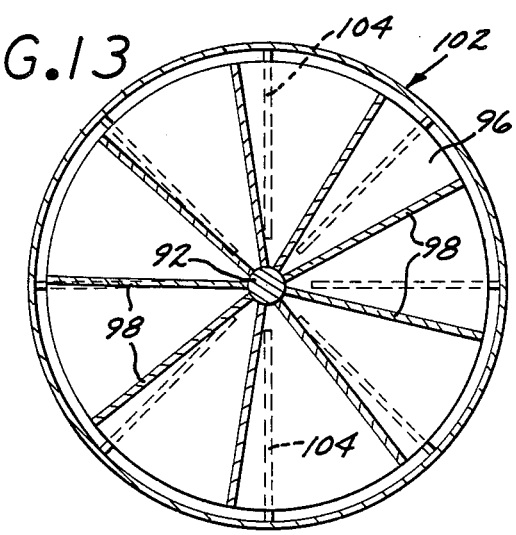

DECELERATION APPARATUS AND METHOD FOR STOPPING A RACING VEHICLE

BACKGROUND OF THE INVENTION

Field of the Invention

The present invention relates to a deceleration apparatus and method, and more particularly to a deceleration apparatus and method for stopping a racing vehicle a predetermined distance beyond a race course finish line after a speed run from a standing start.

So-called drag racing of vehicles from a standing start has been a popular sport for many years. A parachute is normally used to decelerate and stop the vehicle after it crosses the finish line but the distance traveled by the vehicle beyond the finish line is still relatively great because of the time required to deploy and fill the chute. This circumstance and the high noise level experienced during drag competition limit practice of the sport to a few drag strips located in sparsely populated locations far from urban centers. The number of such strips is further limited because they are usually dedicated solely to drag racing, and that is often not economically viable.

There has been a recent trend toward bringing off-road racing events into walled, multi-use sports stadiums. Dirt is trucked in to convert the earthen floor of the stadium from a baseball or football field into a race course simulating the rough terrain of traditional off-road racing events. It is now common for various classes of four wheel vehicles and motorcycles to compete in sports stadiums for racing fans who would not ordinarily be able to view off-road events like those run in Baja Calif. or in the desert. The confines of the stadium are adequate to lay out a tight race course, and the noise of the events is muted by the stadium walls. Moreover, the stadium can quickly be returned to its original state for baseball or football use by trucking out the dirt and laying down sod or artificial turf.

Racing promoters would also like to bring the excitement of drag racing into stadiums along with the off-road racing events just described. However, insofar as applicant is aware, this has not yet been done because no practical means exists to safely decelerate a four wheeled vehicle or motorcycle type of dragster within the limited distance available in a stadium. If straw bales, piled tires or resilient barriers were to be used, the likelihood is that the driver would be injured by too rapid deceleration or the vehicle would rebound in an unpredictable, uncontrolled manner. Although parachutes could be employed in the same manner as in traditional outdoor drag racing, the distance needed to bring the dragster to a controlled stop once the chute is deployed and filled is still prohibitively great in most stadiums.

The technology of arresting fast landing aircraft is well known, but use of this technique in drag racing would require use of an arresting hook on the racing vehicle, and any accidental failure of the hook to engage the arresting cable adjacent the finish line would be disastrous. The typical arresting cable is shown in U.S. Pat. No. 3,172,625 (D. B. Doolittle) as extending across the runway in the path of the landing aircraft, and slowed by a pair of energy absorber units on opposite sides of the runway.

Another possible device for slowing a dragster might be an arresting spade mounted on the vehicle. The spade could be arranged to dig into the earthen surface beyond the finish line, much like a toboggan is slowed by a plow digging into ice or snow at the end of a run, or it could be arranged to scoop water from a trough in the manner some roller coasters are slowed after a ride. However, neither arrangement would provide a controlled stop and both would require expensive and elaborate preparation and modification of the stadium floor such that the floor could not easily be returned to its original state for use in other sporting events.

Another technology of interest is that shown in U.S. Pat. No. 3,309,044 (Strance et al) for arresting a missile at some point along its vertical flight path. One way cable grip devices are attached to opposite sides of the missile and engage cables which extend from an overhead boom downwardly on opposite sides of the missile to define the flight path. The cable grips permit free upward movement of the missile but prevent downward movement once the missile is stopped. A system of bridles and associated cables are attached to the missile and are payed out at a preprogrammed rate to slow and stop the missile, in suspended relation beneath the boom. The use of any such cable grip devices or cables at opposite sides of a drag racing course would be impractical for slowing a dragster because of the complexity of the arrangement and the time and effort required to precisely orient the side guide cables relative to the race course.

SUMMARY OF THE INVENTION

According to the present invention, a deceleration apparatus and method are provided which are effective to stop a drag racing vehicle safely within the relatively restricted confines of a facility such as a sports stadium.

The apparatus comprises a tether means having a free payout portion attachable at one end to the vehicle at the race course start line. The payout is arranged behind the vehicle in such a way that it freely pays out on vehicle acceleration. The length of the payout portion approximates the length of the race course. Energy absorption means are coupled to the tether means so that tension is developed in the payout portion when the racing vehicle reaches the finish line. The material of the payout portion is preferably resilient to take up the initial shock although some equivalent mechanism can be included in the tether means to accomplish this function. Thereafter the energy absorption means decelerates the vehicle within a predetermined distance from the finish line and releases the stored energy in the tether means so that the vehicle is not pulled back toward the start line.

In one embodiment the tether means includes a strap and a cable. The strap constitutes a free payout portion and it extends around a rotatable thrust sheave fixed in the ground behind the vehicle. It also extends around an idler sheave located to one side of the race track. There it is connected to the cable, which extends to the finish line substantially parallel to the race course. At the finish line, the cable is wound around a reel associated with a braking means which forms part of the energy absorption means. The braking means is manually controlled by an operator seated in a protective cage adjacent the finish line. The braking means frictionally engages the reel and slows the cable pay out so that energy stored in the strap is gradually released, along with deceleration and stopping of the vehicle in the available distance.

A quick disconnect fitting enables the tether payout portion or strap to be disconnected from the vehicle at the finish line. The tether cable can then be rewound upon the cable reel, with the tether strap arranged behind the racing vehicle next in line.

In another embodiment of the invention, the tether means includes a free payout portion or strap and a tape which is wrapped upon itself and around a tape reel fixed in position behind the start line. The reel is coupled to a rotor having drag vanes rotatable adjacent to stator vanes mounted in a liquid filled compartment. When the slack in the payout portion is taken up on arrival of the vehicle at the finish line, the payout portion is placed under relatively high initial stress. This is relieved by any suitable means, such as by making the payout portion stretchable, such that the stress is relieved and initial unwrapping of the tape from the tape reel is at a relatively slow rate. Thereafter the rate of pay out increases such that the turbulent liquid flow between the rotor and stator vanes has an increased retardation effect on the tape reel. This slows the vehicle so that tape payout is reduced. Another factor affecting retardation is that the line of pull of the tape is upon a progressively smaller radius of wrapped tape on the reel. As the radius decreases the reel is rotated correspondingly faster. The retardation force eventually diminishes as the vehicle slows, and reaches zero when the vehicle stops. At that point no force is present in the tether means to move the vehicle backwardly once it stops.

The arresting force can also be affected by adjusting the liquid level in the rotor/stator compartment.

Other aspects and advantages of the present invention will become apparent from the following more detailed description taken in conjunction with the accompanying drawings.

BRIEF DESCRIPTION OF THE DRAWINGS

FIG. 1 is a top plan schematic view of the present deceleration apparatus in association with a drag racing vehicle at the start line of a race course;

FIG. 2 is a view similar to FIG. 1, but illustrating the positions of the components upon completion of a speed run over the race course;

FIG. 3 is a perspective view of the braking means operative to adjustably release and pay out cable to adjust the rate of vehicle deceleration and the release of stored energy in the vehicle tether means upon arrival of the vehicle at the finish line;

FIG. 4 is an enlarged perspective view of the thrust sheave which in one tether means configuration establishes alignment of the tether cable for cooperation with the braking means of FIG. 3;

FIG. 5 is a perspective view of the thrust anchor means and associated thrust sheave located behind the racing vehicle, and operative to redirect the strap of the tether means toward the idler sheave of FIG. 4;

FIG. 10 is a perspective view of a second embodiment of the present apparatus, illustrating an energy absorption means which includes a rotary fluid brake means;

FIG. 11 is an enlarged view taken along the line 11—11 of FIG. 10;

FIG. 12 is a view taken along the line 12—12 of FIG. 11; and

FIG. 13 is a view on a reduced scale, taken along the line 13—13 of FIG. 11.

DESCRIPTION OF THE PREFERRED EMBODIMENT

Figure 6:
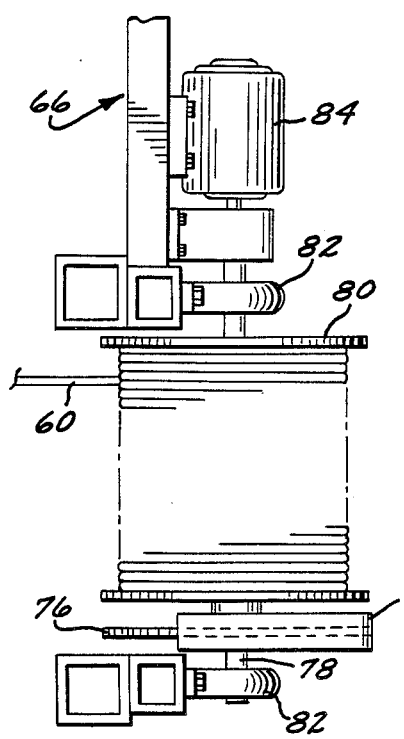
FIG. 6 is an enlarged view taken along the line 6—6 of FIG. 3.

Referring now to the drawings, and particularly to FIGS. 1-9, the present apparatus comprises, generally, a tether means 9 having a free payout portion 10 for attachment at one end to the back end of a racing vehicle 12 at the start line 14 of a race course. The apparatus also comprises energy absorption means 18 coupled to the tether means 9 and operative to place the payout portion 10 in tension when the racing vehicle reaches the race course finish line 16, and thereafter to decelerate and stop the vehicle within a predetermined distance beyond the finish line and release any stored energy in the tether means.

In the illustrated embodiment the free payout portion 10 is a woven continuous nylon material having a width greater than its thickness, and characterized by an ability to stretch or extend longitudinally when it is placed under a predetermined amount of tension. The stretchability of the payout portion is one convenient means for absorbing the high initial stresses developed when the vehicle takes up the slack in the portion 10. If desired, a spring reel (not shown) or the like could be provided in a relatively non-stretchable portion 10 to achieve a similar result.

The portion 10 is flexible and relatively light in weight for ease of handling and to enable it to be loosely laid out behind the racing vehicle at the start line. This also permits it to freely pay out on vehicle acceleration without significantly affecting acceleration of the vehicle as it makes its speed run down the race course. Alternatively, the portion 10 could be arranged in a more compact manner if desired, such as by coiling it upon a free running reel or the like (not shown).

The length of portion 10 approximates the length of the race course between the start and finish lines 14 and 16. Consequently, it is placed in tension when the vehicle reaches the finish line. The portion 10 is characterized by longitudinal stretching at that point to take up the initial shock. Then, when the inertia in the system components is overcome, the tether means gradually unwinds or pays out.

The floor of the sports stadium on which the race course is laid out is usually natural soil or earth, and several of the major components of the energy absorption means are preferably constructed so that they can be buried in the soil to fix or anchor them in position. The particular type or arrangement of anchorage is not critical so long as the anchorage system is fixed against movement, or its movement is constrained within permissible limits. For example, if the stadium floor is made of concrete, heavy frictionally constrained anchorages could be used, or the anchorages could be elements integral with the concrete.

As seen in FIG. 5, the energy absorption means of that embodiment includes an anchorage frame 31 which mounts a thrust pulley or sheave 20. The sheave is carried by an axle 22 for rotation about a vertical axis. Opposite ends of the axle are rotatable in pillow or bearing blocks, one of which is illustrated at 24. These in turn are secured to anchorage cross members 26, only one of which is seen, located above and below the sheave 20. The members 26 are fixed in position by vertical and diagonal members 30 and 32, respectively, which are secured to the frame 31. The frame forwardly of the sheave 20 defines a generally rectangular, upwardly opening container 30 which is filled with ballast such as earth to help anchor the frame 31 in position immediately behind the racing vehicle 12.

Figure 7:
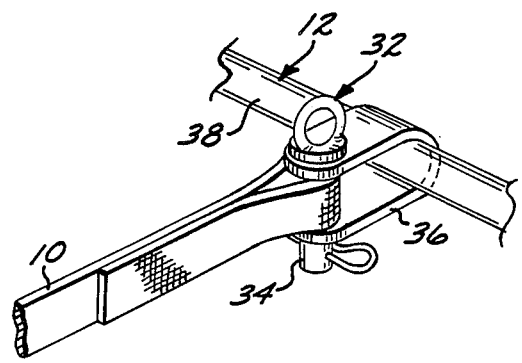
FIG. 7 is an enlarged detail perspective view of the disconnect fitting, together with portions of the racing vehicle and the tether, as indicated by the arrowed numeral 7 in FIG. 1.

As seen in FIG. 7, the vehicle end of the tether portion 10 is formed into a closed loop for connection to the vehicle 12 by a quick disconnect fitting 32. The fitting 32 comprises a pin 34 disposed through a metal or plastic bushing carried in the loop of the portion 10, and through vertically aligned openings provided in a clevis 36 which extends around a structural member 38 carried by the vehicle. The pin 34 can be removed quickly by pulling upon a ring located at the upper end of the pin once a safety cotter key at the bottom of the pin is removed.

Figure 8:
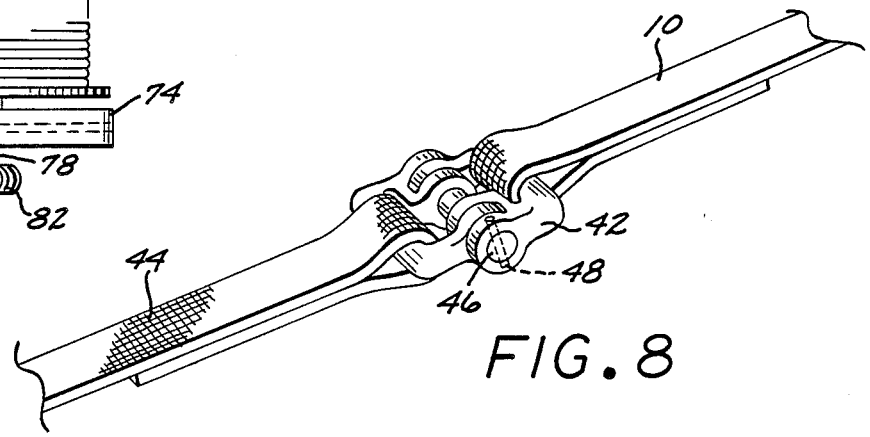
FIG. 8 is an enlarged detailed perspective view of the connection of the free payout portion and the tether strap of the tension means, as indicated by the arrowed numeral 8 in FIG. 1.

The rear or tape end of the portion 10 is also formed into a closed loop. As seen in FIG. 8, the loop extends through an opening in one half of a hinge knuckle connector 42. The knuckles of the connector halves interfit and are pivotally connected together by a hinge pin 46, which is removable upon release of a cross pin 48. The other connector half mounts the closed loop end of an elongated tape 44.

The tape 44 is preferably a continuous nylon woven strap like the portion 10. When used with heavier vehicles the tape 44 and portion 10 are typically of the same tensile strength, such as approximately 18,000 pounds per square inch. For lighter vehicles the portion 10 is usually characterized by a lower tensile strength. The optimum tensile strength and modulus of elasticity of the strap and tape will be determined by the particular vehicle weight, anticipated speed, maximum deceleration forces, and available stopping distance.

As seen in FIGS. 1 and 2, the tape 44 is reeved or trained around the thrust sheave 20, and then is disposed laterally and forwardly about an idler pulley or sheave 50 located to one side of the race course. The sheaves 20 and 50 simply change the direction of the tether means and the line of pull.

As seen in FIG. 4, the idler sheave is fixed to a vertical shaft which is rotatably carried by a horizontal plate 52 having a pair of apertured mounting ears or tabs 54. Although the plate 52 could be buried in the earth and ballasted in the same way as the thrust sheave frame 31, the plate 31 is fixed in position by coupling it to an adjacent pair of water filled barricades 56. A number of such barricades are interconnected and extend forwardly and laterally from the thrust sheave to the idler sheave, and then along the full length of the race course.

Although any suitable barricade can be used to protect the energy absorption components and weight them in position, the filled barricades shown in my U.S. Pat. No. 4,681,302, issued July 21, 1987, have been found to perform satisfactorily. The barricades are filled with water and their ends are secured together by vertical rods 58. Similar rods are used to secure the idler sheave plate 52 to the adjacent barricades. The weight of the water filled barricades is ample to anchor the idler sheave and plate in position.

Figure 9:
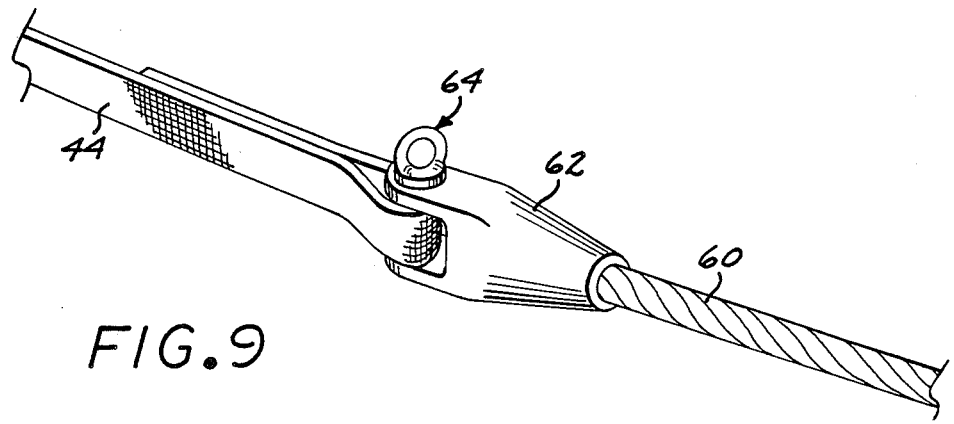
FIG. 9 is an enlarged detail perspective view of the connection between the tether strap and cable, as indicated by the arrowed numeral 9 in FIG. 1.

The forward end of the tape 44 is connected to a cable 60, as seen in FIG. 9, by ordinary cable clamp or by a clevis 62 which is mounted integral with the cable end. The cable in one embodiment is ⅜ inch diameter steel cable. The pin of a quick disconnect fitting 64 like the previously described quick disconnect fitting 32 passes through the clevis and through a closed loop end formed in the tape 44.

The particular form of fittings 32, 42 and 64 is not critical. The fittings illustrated are one convenient means to enable rapid attachment to successive vehicles or interconnection of the tether means and energy absorption components.

The energy absorption means also includes a braking apparatus 66 which is mounted in a protective cage 68 located to one side of the race course adjacent the finish line 16. The cage 68 is a welded framework made up of channel members arranged to form a protective enclosure for a brake operator (not shown) who is seated in the cage in a position where he can observe the vehicle as it approaches and crosses the finish line.

As seen in FIG. 3, the cage 68 is welded to a base plate 70 buried in the earth below the stadium surface 28. This anchors the cage in position. Further anchoring is provided by attachment of the cage to the adjacent barricades by vertical rods 58. These pass through vertically aligned openings in mounting tabs 72 which are fixed to opposite sides of the cage 68. The rods also pass through similar mounting members integral with the adjacent barricades 56.

The braking apparatus 66 includes a cable drum or reel 80 onto which the cable 60 is coiled or wrapped. As seen in FIGS. 3 and 6, the reel 80 is fixed to a transverse shaft 78 which is rotatably carried at its opposite ends by pillow or bearing blocks 82 attached to upright members of the cage 68. The shaft 78 is rotatable by a motor 84 operating through a suitable gear box to wind the cable 60 onto the cable reel 80.

The shaft 78 also mounts a usual brake disk 76 which is associated with usual brake disk pad mounts, or calipers 74. The calipers 74 are conventional in construction and operation and are hydraulically actuated to bear against the disk 76 to slow rotation of the cable reel 80.

When the racing vehicle reaches the finish line, the cable reel will be rotated by the tension exerted through the payout portion 10 and tape 44. The operator visually gauges the arrival of the vehicle at the finish line and brakes the rotation of the cable drum in a manner that will slow the vehicle without developing high deceleration or "G" loads, and then release the stored energy in the tether means when the vehicle stops. This is done by operating a control lever or handle 88 located on the cage near him to control or modulate the brake pressure developed by the master brake cylinder 86 of the system. The optimum level of hydraulic pressure necessary for proper braking is predetermined during test runs, and the operator closely observes the hydraulic pressure in the system by reading a suitable gauge (not shown). Of course, the braking pressure can be automatically controlled, without operator intervention, by a computer controlled system which would apply braking pressures according to a predetermined braking pressure profile.

Thus, in a typical racing sequence, the portion 10 is attached to a vehicle at the start line by use of the quick disconnect fitting 32. When the vehicle completes its run, the loosely arranged portion 10 will have been payed out. As it is placed in tension, it will initially stretch, as will the strap 44. As previously indicated, the tether means could be made relatively non-stretchable, if desired, if some other shock absorbing mechanism were used in conjunction with the tether means, such as a spring reel, dash pot or the like (not shown). Such a means takes up some of the initial stress in the portion 10 until the inertia of the sheaves and other components is overcome enough to allow cable 60 to be pulled off the tape reel 80. The operator in the cage 68 then applies a braking force to the cable reel, being careful to modulate the brake pressure to avoid developing excessive deceleration or "G" forces. The braking force is completely released when the vehicle comes to a standstill to remove any tension remaining in the tether means 9 which might pull the vehicle back toward the start line.

The system of the invention was used successfully in connection with a racing vehicle weighing approximately twenty one hundred pounds. It crossed the finish line at over one hundred miles per hour and was decelerated and stopped in less than one hundred twenty five feet. The length of the race course was approximately two hundred feet. These dimensions, weights and speeds are merely exemplary.

The embodiment of FIGS. 10-13 is similar to the embodiment just described except that the energy absorption means takes the form of a water brake rather than a disc friction brake. The water brake is similar in many respects to the energy absorption means disclosed in the previously identified U.S. Pat. No. 3,172,504 (Daniels et al). However, it is modified and used in a completely different manner, as will be seen.

Instead of being attached to the cable 60 of the previous embodiment, the tape 44 is wrapped upon itself and around a drum or reel 90, as seen in FIGS. 10 and 11. The reel 90 is rigidly coupled to a shaft 92 of a rotor 94. The upper and lower portions of the rotor shaft are rotatably supported in bearings mounted to the upper wall 99 and base 100 of a cylindrical housing 102 which includes or defines an internal chamber for containing a liquid such as water.

The rotor includes a horizontal disc 96 which on its opposite sides mounts oppositely directed, circumferentially spaced apart and radially extending drag or rotor vanes 98. These are rotatable past a plurality of internal stator vanes 104 integral with the housing 102. The stator vanes are circumferentially spaced apart and radially directed in a manner similar to the direction and orientation of the rotor vanes 98, except that the spacing is slightly different to avoid beat frequencies.

The housing is supported in position by a plurality of angle irons 105 attached to the housing and bolted to the underside of a horizontally oriented rectangular plate 106. The tape reel 90 is located above the plate 106, and the upper surface of the forward edge of the plate is welded to a pipe to provide a rounded surface 108 to prevent abrading of the tape during operation of the reel.

The assembly of the housing 102, tape reel 90 and angle irons 105 is supported upon a rectangular, upwardly opening anchorage 110 by welding of the ends of the angle irons to upper frame members of the anchorage 110. The anchorage is buried in the ground, with the housing located in it, and the portion of the anchorage unoccupied by the housing is filled with earth so that it is flush with the adjacent stadium surface 28. This securely anchors the thrust sheave or reel 90 against any movement except rotation about its vertical axis. The earth around the anchorage is preferably compacted with heavy earth moving or compacting equipment to maximum density and without significant voids. This practice is also followed in burying other components of the present system to insure against their movement during racing events. If desired, the framework of the anchorage could be made larger to provide even greater constraint against movement, or suitable anchor cables (not shown) could be attached to the framework and to fixed elements in the stadium floor or other structure.

In operation of the second embodiment, movement of the racing vehicle down the course takes up the slack in the tether. At the finish line the tether becomes taut, stretches, and then tape 44 begins to unwind from the reel 90.

In one successful embodiment of the system, use of mechanical components designed to withstand approximately 50,000 pounds of tensile force was satisfactory. The rotor tape 44 was designed with a tensile strength of approximately 15,000 pounds, and a payout portion 10 was selected which possessed a tensile strength matched to the weight of the vehicle. For example, a tether having 3,000 pounds tensile strength was found suitable for vehicles weighing between 600 and 700 pounds, 6,000 pound tensile strength for vehicles weighing between 800 and 1,200 pounds, and 15,000 pound tensile strength for vehicles weighing over 1,200 pounds. Lighter tethers are more effective with lighter vehicles to reduce the initial shock or "G" forces encountered during initial stretching of the tether means before inertia in the system is overcome and unwinding of the rotor tape occurs.

After stretching of the tether means, rotor inertia is overcome and the reel rotates, accompanied by rotation of the rotor vanes 98 relative to the stator vanes 104. This relative rotation causes water in the housing 102 to be urged centrifugally outwardly, and to flow along the rotor vanes toward the housing walls. There it is turned and urged radially inwardly along the stator vanes to their inner ends, where spaces exist to direct the water toward the roots of the rotor vanes for repeated recirculation. This turbulent, constantly reversing fluid flow develops a torque at the rotor shaft 92 and at the tape reel 90 to absorb the kinetic energy of the speeding vehicle.

The rotor tape 44 initially leaves the reel 90 at a maximum distance from the rotor because all of the tape is initially wrapped on the reel. The early rotation of the rotor is thus at a relatively low rate. As more of the tape is unwound, the rotor rotates at a faster rate because of the reduced diameter of the wrapped tape remaining on the reel. Thus, the system is speed sensitive. The faster the rotor spins the more the braking force exerted upon the tape reel, the rotor reaching a speed of approximately 30 revolutions per second in actual operation. Conversely, when the vehicle slows the braking force diminishes and reaches zero when the vehicle comes to a standstill. There is thus no tension in the tether means to pull the vehicle back toward the start line.

On conclusion of a run, the quick disconnect fitting 32 is operated to free the vehicle, following which the tape 44 is rewound on the tape reel 90. The payout portion 10 is then attached to the next racing vehicle.

Rewinding of the rotor tape 44 is conveniently accomplished by operating an electric motor 118 which, as seen in FIG. 11, is bolted to the rotor housing 102 to rotate a V-belt pulley 114 connected by a V-belt to a larger pulley 116 fixed to the underside of the tape reel 90.

The system is characterized by considerable flexibility in design to achieve stopping of a vehicle within available distances, while protecting vehicle drivers, and particularly the drivers of lighter vehicles, from excessive deceleration loads on rotor start up and at maximum rotor speed. Preferably the minimum diameter rotor is selected that will handle the heaviest, fastest vehicles. The tether tape 10 is then selected which has a tensile strength to match the approximate vehicle weight, as previously indicated. Substitution of one tether for another can be done quickly and easily before a race to modify the system for different classes of racing vehicles, including four wheeled dragsters as well as motorcycle dragsters. Likewise, the level of water or other liquid in the housing container can easily be adjusted prior to a race. The amount of water can be varied to match various vehicle weights and to control the maximum rate of rotor revolution, which is a measure of energy absorption. For larger and heavier vehicles the housing container is filled to greater levels, with higher capacity tethers then being selected.

Although both embodiments have produced satisfactory results in bringing drag race vehicles to controlled stops within acceptable distances in sports stadiums, the embodiment of FIGS. 10–13 has operated particularly well in that it does not require the intervention of a brake operator or the like.

Various modifications and changes may be made with regard to the foregoing detailed description without departing from the spirit of the invention.

I claim:

1. Deceleration apparatus for stopping a racing vehicle within a predetermined distance beyond the finish line of a race course, the deceleration apparatus comprising:
   tether means having a free extremity for attachment to a racing vehicle located at a race course start line, the free extremity comprising an elongated flexible free payout portion for free payout on vehicle acceleration, the length of the free payout portion approximating the length of the race course; and
   energy absorption means adapted for location separately of the racing vehicle and coupled to the extremity of the tether means opposite the free extremity for placing the free payout portion in tension when the racing vehicle reaches the finish line, and operative for decelerating and stopping the vehicle within a predetermined distance.

2. Deceleration apparatus according to claim 1 in which the tether means is operative to resiliently elongate a predetermined amount upon being placed in tension to absorb a portion of the tensile loads developed when the racing vehicle reaches the finish line.

3. Deceleration apparatus according to claim 2 in which at least a portion of the tether means is made of resilient material adapted to resiliently elongate a predetermined amount.

4. Deceleration apparatus according to claim 2 in which the free payout portion is resiliently elongatable, and in which the free payout portion is detachable from the remainder of the tether means for substitution of a different payout portion having a different degree of resilient elongation.

5. Deceleration apparatus according to claim 1 in which the free payout portion is loosely laid out upon the surface behind the racing vehicle.

6. Deceleration apparatus for stopping a racing vehicle within a predetermined distance beyond the finish line of a race course, the deceleration apparatus comprising:
   an elongated cable;
   a thrust sheave;
   a thrust anchor means carrying the thrust sheave for rotation about an axis located behind the racing vehicle;
   an idler sheave for rotation about an axis located at one side of the race course;
   tether means for attachment to a racing vehicle at a race course start line, the tether means including a elongated flexible free payout portion for free payout on vehicle acceleration, the length of the free payout portion approximating the length of the race course, the tether means further including an elongated tape trained abut the thrust and idler sheaves and coupled to the cable, and an elongated strap having a tape end attached to the tape and a vehicle end attachable to the racing vehicle; and
   energy absorption means coupled to the tether means and operative to place the tether means in tension when the racing vehicle reaches the finish line, and thereafter to decelerate and stop the vehicle within a predetermined distance, the energy absorption means including a braking means coupled to the cable and operative to adjustably release and pay out the cable upon arrival of the racing vehicle at the finish line to adjust the rate of vehicle deceleration.

7. Deceleration apparatus according to claim 6 in which the braking means comprises a disk brake manually actuable by a braking means operator.

8. Deceleration apparatus according to claim 7 and further comprising a protective cage mounting the braking means and adapted to enclose a braking means operator.

9. Deceleration apparatus according to claim 1 in which the tether means includes a quick disconnect fitting for attaching the tether means to the frame of the racing vehicle.

10. Deceleration apparatus for stopping a racing vehicle within a predetermined distance beyond the finish line of a race course, the deceleration apparatus comprising:
    tether means for attachment to a racing vehicle at a race course start line, the tether means including an elongated flexible free payout portion for free payout on vehicle acceleration, the length of the free payout portion approximating the length of the race course; and
    energy absorption means coupled to the tether means and operative to place the tether means in tension when the racing vehicle reaches the finish line, and thereafter to decelerate and stop the vehicle within a predetermined distance, the energy absorption means including a housing for anchorage behind a racing vehicle, the housing defining a chamber having stator vanes; a liquid immersed rotor having rotor vanes rotatable in the chamber adjacent the stator vanes; and reel means coupled to the rotor for receiving wraps of the tether means and for paying out the tether means on rotation of the rotor in a payout direction.

11. Deceleration apparatus for stopping a racing vehicle within a predetermined distance beyond the finish line of a race course, the deceleration apparatus comprising:

tether means for attachment to a racing vehicle at a race course start line, the tether means including an elongated flexible free payout portion for free payout on vehicle acceleration, the length of the free payout portion approximating the length of the race course; and energy absorption means coupled to the tether means and operative to place the tether means in tension when the racing vehicle reaches the finish line, and thereafter to decelerate and stop the vehicle within a predetermined distance, the energy absorption means including an anchorage frame for fixed location behind a racing vehicle and including a housing defining a chamber having stator vanes, a liquid immersed rotor having rotor vanes rotatable in the chamber adjacent the stator vanes; and reel means coupled to the rotor for receiving wraps of the tether means and for paying out the tether means on rotation of the rotor in a payout direction.

12. In combination with a race course having a start line and a finish line, and a racing vehicle at the start line; deceleration apparatus for arresting the vehicle a predetermined distance beyond the finish line, the deceleration apparatus comprising:

tether means attached at one end to the racing vehicle at the start line, the tether means including a flexible payout portion for free payout on vehicle acceleration, the length of the payout portion approximating the length of the race course; and energy absorption means located separately of the racing vehicle and coupled to the tether means for placing the tether means in tension when the racing vehicle reaches the finish line, and operative for decelerating and stopping the vehicle within the predetermined distance.

13. In combination with a race course having a start line and a finish line, and a racing vehicle at the start line; deceleration apparatus for arresting the vehicle a predetermined distance beyond the finish line the, the deceleration apparatus comprising:

an elongated cable;

a thrust sheave;

a thrust anchor means carrying the thrust sheave for rotation about an axis located behind the racing vehicle;

an idler sheave for rotation abut an axis located at one side of the race course;

tether means attached at one end to the racing vehicle at the start line, the tether means including a flexible payout portion for free payout on vehicle acceleration, the length of the payout portion approximating the length of the race course, the tether means further including an elongated tape trained about the thrust and idler sheaves and coupled to the cable, and an elongated strap having a tape end attached to the tape and a vehicle end attached to the racing vehicle; and energy absorption means coupled to the tether means and operative to place the tether means in tension when the racing vehicle reaches the finish line, and thereafter to decelerate and stop the vehicle within the predetermined distance, the energy absorption means including a braking means coupled to the cable and operative to adjustably release and pay out the cable upon arrival of the racing vehicle at the finish line to adjust the rate of vehicle deceleration.

14. Deceleration apparatus according to claim 13 in which the braking means comprises a disk brake manually actuable by a braking means operator.

15. Deceleration apparatus according to claim 14 and further comprising a protective cage mounting the braking means and adapted to enclose a braking means operator.

16. Deceleration apparatus according to claim 12 in which the tether means includes a quick disconnect fitting attaching the tether means to the frame of the racing vehicle.

17. In combination with a race course having a start line and a finish line, and a racing vehicle at the start line; deceleration apparatus for arresting the vehicle a predetermined distance beyond the finish line, the deceleration apparatus comprising:

tether means attached at one end to the racing vehicle at the start line, the tether means including a flexible payout portion for free payout on vehicle acceleration, the length of the payout portion approximately the length of the race course; and energy absorption means coupled to the tether means and operative to place the tether means in tension when the racing vehicle reaches the finish line, and thereafter to decelerate and stop the vehicle within the predetermined distance, the energy absorption means including a housing anchored behind the racing vehicle and defining a chamber having stator vanes; a rotor having rotor vanes rotatable in the chamber adjacent the stator vanes; and reel means coupled to the rotor for receiving wraps of the tether means and for paying out the tether means on rotation of the rotor in a payout direction.

18. In combination with an earthen race course having a start line and a finish line, and a racing vehicle at the start line; deceleration apparatus for arresting the vehicle a predetermined distance beyond the finish line, the deceleration apparatus comprising:

tether means attached at one end to the racing vehicle at the start line, the tether means including a flexible payout portion for free payout on vehicle acceleration, the length of the payout portion approximating the length of the race course; and energy absorption means coupled to the tether means and operative to place the tether means in tension when the racing vehicle reaches the finish line, and thereafter to decelerate and stop the vehicle within the predetermined distance, the energy absorption means including an anchorage frame buried flush with the race course surface behind the racing vehicle, the anchorage frame including a housing defining a chamber having stator vanes, the anchorage frame further including an upwardly opening compartment filled with earth to fix the anchorage frame in position; a rotor having rotor vanes rotatable in the chamber adjacent the stator vanes; and reel means coupled to the rotor for receiving wraps of the tether means and for paying out the tether means on rotation of the rotor in a payout direction.

19. A deceleration method for stopping a racing vehicle a predetermined distance beyond the finish line of a race course upon completion by the vehicle of a speed run over the race course, the method comprising the steps of:

attaching to the racing vehicle at the race course start line a tether means which includes a payout portion having a length approximating the length of the race course; and locating energy absorption means separately of the racing vehicle and coupling the energy absorption means to the tether means; and operating the energy absorption means on payout of the payout portion to decelerate and stop the vehicle within the predetermined distance.

20. A deceleration method according to claim 19 in which the step of attaching is followed by the step of loosely arranging the payout portion behind the racing vehicle for free payout.

21. A deceleration method for stopping a drag racing vehicle a predetermined distance beyond the finish line of a race course upon completion by the vehicle of a speed run over the race course, the method comprising the steps of:

attaching to the vehicle at the race course start line a tether means which includes a payout portion located eternally of the vehicle and having a length approximating the length of the race course;

allowing the payout portion to freely pay out; and thereafter controlling the rate of paying out of the tether means to decelerate and stop the vehicle within the predetermined distance.

22. A deceleration method according to claim 21 in which the tether means is coupled to a reel, and the rate of paying out of the tape is controlled by frictionally braking the rotation of the reel.

23. A deceleration method according to claim 21 in which the tether means is coupled to a reel coupled to a rotor having drag vanes rotatable in a liquid filled chamber, and the rate of paying out of the tape is controlled by retardation of rotation of the drag vanes in the liquid.

24. A deceleration method according to claim 23 in which the rate of paying out of the tether means is adjusted by adjusting the amount of liquid in the chamber.

* * * * *